(12) United States Patent
Komori

(10) Patent No.: US 7,735,389 B2
(45) Date of Patent: Jun. 15, 2010

(54) DOUBLE CLUTCH TRANSMISSION

(75) Inventor: Katsuhiro Komori, Okazaki (JP)

(73) Assignees: Mitsubishi Jidosha Kogyo Kabushiki Kaisha, Tokyo (JP); Mitsubishi Jidosha Engineering Kabushiki Kaisha, Aichi (JP)

( * ) Notice: Subject to any disclaimer, the term of this patent is extended or adjusted under 35 U.S.C. 154(b) by 474 days.

(21) Appl. No.: 11/806,025

(22) Filed: May 29, 2007

(65) Prior Publication Data

US 2007/0277634 A1 Dec. 6, 2007

(30) Foreign Application Priority Data

May 30, 2006 (JP) .............. P2006-150420

(51) Int. Cl.
*F16H 3/38* (2006.01)
(52) U.S. Cl. .............. 74/340; 74/329; 74/331; 384/465
(58) Field of Classification Search .............. 74/329, 74/331, 340
See application file for complete search history.

(56) References Cited

U.S. PATENT DOCUMENTS

| | | | | |
|---|---|---|---|---|
| 1,663,026 | A | * | 3/1928 | Schultze .................. 74/339 |
| 1,970,385 | A | * | 8/1934 | Maybach .................. 184/11.1 |
| 4,565,102 | A | * | 1/1986 | Miyahara et al. ............. 74/15.4 |
| 4,771,648 | A | | 9/1988 | Bardoll et al. |
| 6,209,407 | B1 | | 4/2001 | Heinzel et al. |

FOREIGN PATENT DOCUMENTS

| | | |
|---|---|---|
| DE | 198 21 164 | 11/1999 |
| DE | 10 2004 046 297 A1 | 3/2006 |
| DE | 10 2004 055 121 A1 | 5/2006 |
| EP | 0 075 408 A2 | 3/1983 |
| EP | 0 212 182 A1 | 3/1987 |
| EP | 1 729 033 A1 | 12/2006 |
| FR | 2 801 010 A1 | 5/2001 |
| JP | 58-135557 U | 9/1983 |
| JP | 62-69651 U | 5/1987 |
| JP | 2006-52832 A | 2/2006 |

\* cited by examiner

*Primary Examiner*—David D Le
*Assistant Examiner*—Derek D Knight
(74) *Attorney, Agent, or Firm*—Birch, Stewart, Kolasch & Birch, LLP

(57) ABSTRACT

An input system includes an input shaft portion, including a first and second input shafts, bearings, rotatably supporting the input shaft portion; and clutches, for transmitting rotational power to the first or second input shafts. An output system includes a first and second output shafts, and a plurality of driven gearwheels, which mesh with drive gearwheels of the first and second input shafts. Driven gearwheels for low gears disposed on the second output shaft are submerged in lubricating oil in an oil reservoir provided below the second output shaft. Drive gearwheels for low gears are disposed adjacent to the bearings. Tooth width dimensions of the drive gearwheels for the low gears are larger than tooth width dimensions of the driven gearwheels for the low gears. Exposed tooth width portions of the drive gearwheels constitute oil splashing portions which splash lubricating oil splashed by the driven gearwheels on to the bearings.

4 Claims, 5 Drawing Sheets

DOUBLE CLUTCH TRANSMISSION

BACKGROUND OF THE INVENTION

1. Field of the Invention

The present invention relates a double clutch transmission which enables continuous gear ratio changes by a synchromesh mechanism which suppresses the disruption of power transmission to a minimum level using two clutches and two input shafts.

2. Description of Related Art

In automatic transmissions for vehicles (automobiles), there is a transmission referred to as a double clutch transmission which enables continuous gear ratio changes while suppressing the loss of power in transmission by utilizing a constant mesh (a constant mesh between drive gearwheels and driven gearwheels) gear mechanism.

In this double clutch transmission, a construction is adopted in which an input system which uses two input shafts having drive gearwheels and two clutches and an output system which uses two output shafts having driven gearwheels and synchromesh mechanisms are combined together. Specifically, as the input system, for example, a plurality of forward gears are divided into gear groups; a group of even-numbered gears and a group of odd-numbered gears, and drive gearwheels of the odd-numbered gear group are provided on either a first input shaft or a second input shaft which rotates on the periphery of the first input shaft, both the input shafts being connected to clutches, respectively, while drive gearwheels of the even-numbered gear group are provided on the other input shaft, whereby rotational power of an engine is transmitted to the first or second input shaft via the corresponding clutch. In addition, as the output system, a construction is adopted in which driven gearwheels, which are adapted to mesh with the mating drive gearwheels, are allocated together with synchromesh mechanisms on first and second output shafts which are provided in parallel to the first and second input shafts.

According to these input and output systems, for example, by making use of a duration when a gear shift of the odd-numbered gear group is completed and the rotational power of the engine inputted into the first input shaft from the corresponding clutch is changed in speed for output from one of the output shaft, a drive gearwheel for the next higher or lower gear on the even-numbered gear group is synchronized with a speed which is transmitted from the other output shaft by means of a synchromesh mechanism, so that a gear ratio change for the next higher or lower gear can be prepared. Because of this, when a currently active odd-numbered gear is shifted to the next higher or lower even-numbered gear, in the event that the clutch which is connecting the first input shaft to the engine is disengaged, while the other disengaged clutch is engaged to switch the power transmission to a transmission from the second input shaft, the currently active gear is shifted to the next higher or lower even-numbered gear on the spot. Furthermore, also when the currently active even-numbered gear is shifted to the next higher or lower odd-numbered gear, the next higher or lower odd-numbered gear on the first input shaft is synchronized with the vehicle speed for preparation for a gear shift to the next gear while the rotational power of the engine is transmitted via the second input shaft, a gear shift to the next higher or lower odd-numbered bear is completed. Therefore, gear shifts from low-speed gear to high speed gear, that is, a first gear to a sixth gear can be performed quickly and continuously while suppressing the loss of power or drive in transmission, that is, quick and continuous gear ratio changes can be performed from the first gear to the sixth gear.

In double clutch transmissions like this, as is disclosed in JP-A-2006-52832, it is normal practice to support rotatably an input shaft portion including a first and second input shaft by bearings.

Incidentally, since bearings at both ends of the input shaft portion each have to bear large load, a quite good lubrication is required to lubricate the respective bearings.

In a related art, in a transmission, lubricating oil which is collected in an oil reservoir located below an output shaft is splashed by driven gearwheels provided on the output shaft so as to produce a lubricating oil atmosphere in an interior of the transmission for lubrication of the bearings.

In the double clutch transmission, however, there exists a tendency that sufficient lubrication cannot be attained only by the lubricating oil atmosphere.

As a countermeasure against this tendency, as is disclosed in JP-A-2006-52832, it is a related practice to provide a separate lubricating oil supply mechanism with a view to securing a required lubricating performance.

Consequently, adding the same mechanism has led to problems that the size of the resulting double clutch transmission is enlarged, the construction thereof becomes complex, and costs that are borne by manufacturers are increased, and therefore, there have been demands for different methods.

SUMMARY OF THE INVENTION

It is therefore an object of the invention to provide a double clutch transmission which enables good lubrication of bearings which support input shafts using the existing components.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAIL DESCRIPTION OF THE INVENTION

Hereinafter, the invention will be described based on an embodiment which is shown in FIGS. 1 to 5B.

Figure 1:
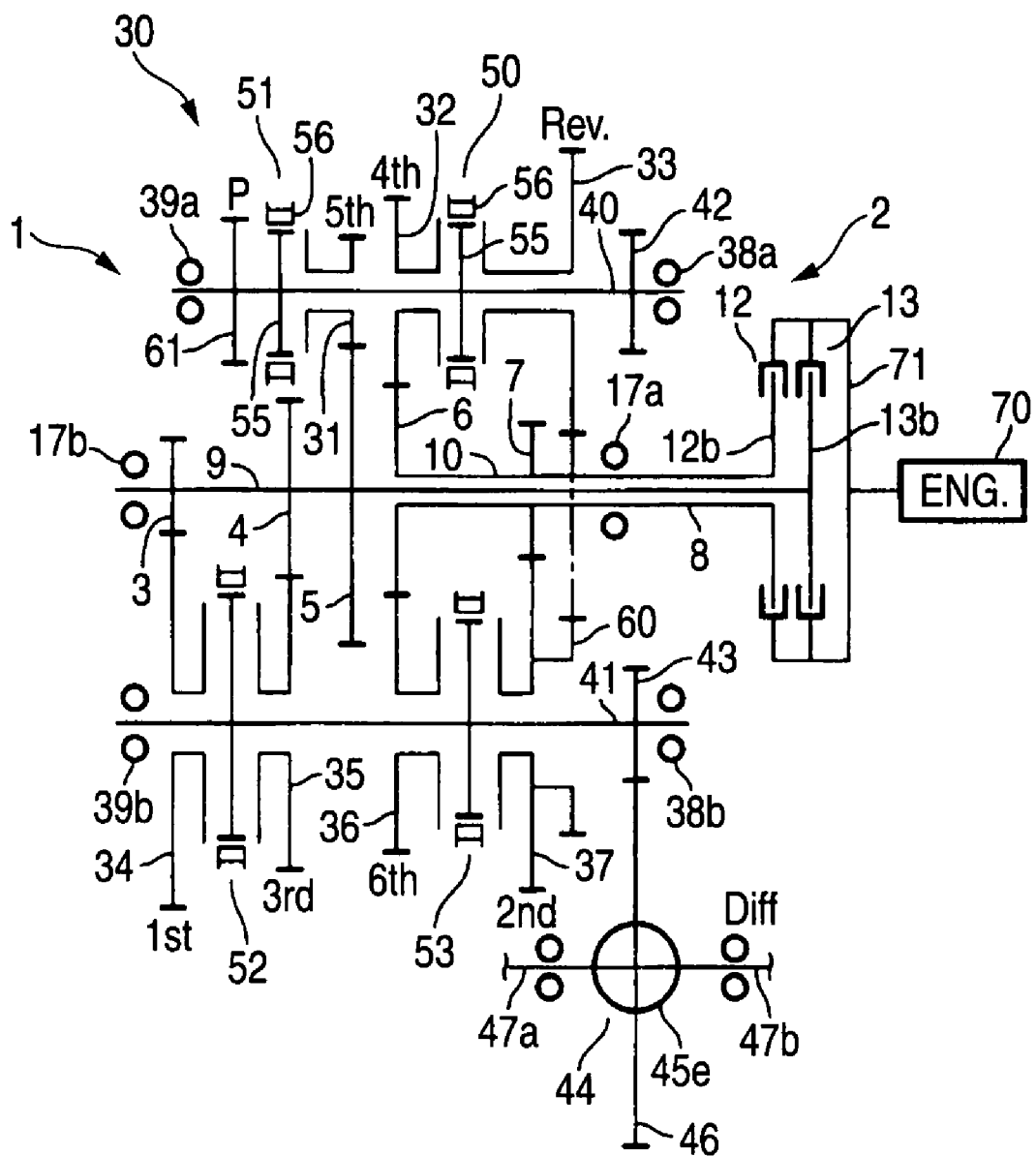
FIG. 1 is a schematic drawing of a double clutch transmission according to an embodiment of the invention.

FIG. 1 shows a schematic configuration of a transversely mounted double clutch transmission having, for example, seven gears; six forward gears and one reverse gear, and in the figure, reference numeral 1 denotes a main body portion of the double clutch transmission. A construction in which an input system 2 and an output system 30 are combined is adopted for the main body portion 1. Of these systems, in the input system 2, a construction is adopted in which an input shaft portion 8 which is made up of a combination of two input shafts 9, 10 on which a plurality of drive gearwheels 3 to 7 are disposed is combined with two clutches 12, 13. In the output system 30, a construction is adopted in which two output shafts 40, 41 are used on which driven gearwheels 31 to 37 and synchromesh mechanisms 50 to 53 are disposed.

Figure 2:
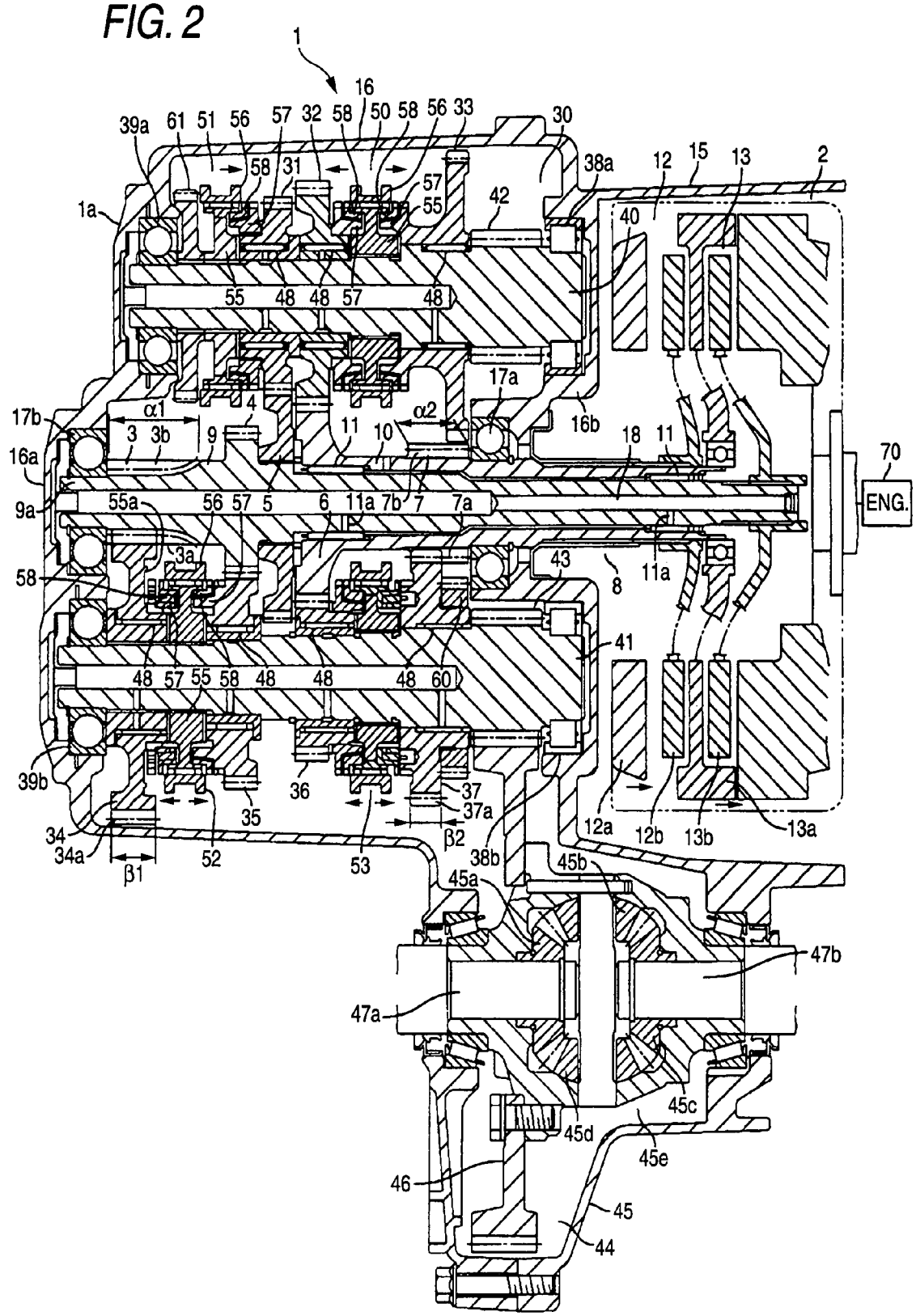
FIG. 2 is a front sectional view of the double clutch transmission.
Figure 3:
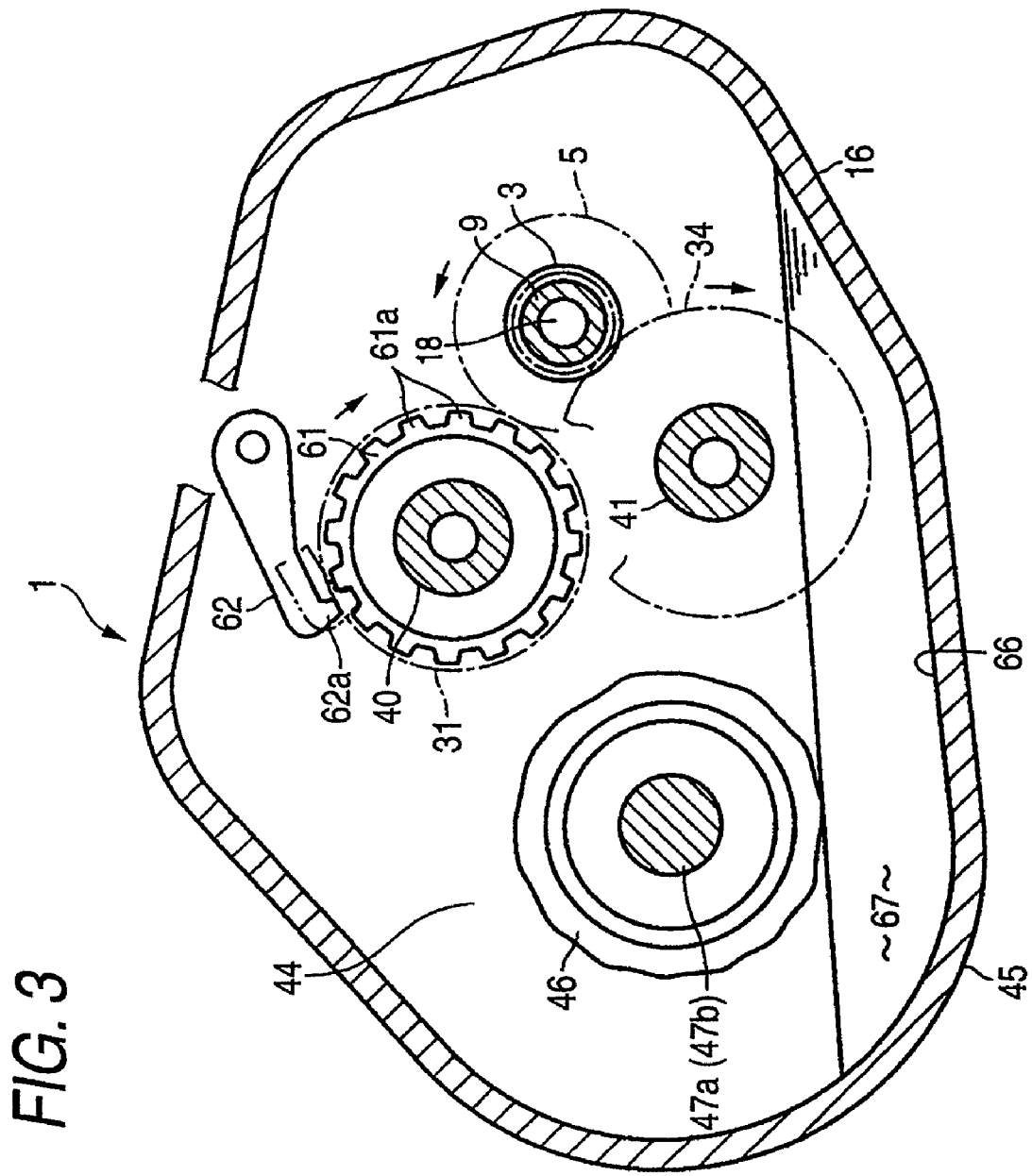
FIG. 3 is a side sectional view of the double clutch transmission.

FIG. 2 shows a front sectional view showing the development of the double clutch transmission which illustrates a detailed construction thereof, and FIG. 3 shows a side sectional view of the double clutch transmission. Referring to FIGS. 2 and 3, the construction of the input system 2 will be described. In the figures, reference numeral 15 denotes a clutch case, and 16 a transmission case which is connected in series to the clutch case 15. The clutches 12, 13 are accommodated in the clutch case 15. These clutches 12, 13 are made up, for example, by aligning two pusher plates 12a, 13a which connect to an output shaft of an engine 70 and two independent dry clutch plates 12b, 13b which connect to input shafts 9, 10, respectively, alternately in an axial direction, whereby the pusher plates 12a, 13a can be made to be brought into tight contact with and separation from the clutch plates 12b, 13b, respectively, when the pusher plates 12a, 13b are caused to move (operate).

The input shaft portion 8 is provided within the transmission case 16. A shaft member which has a through hole 18 provided along an axial center thereof for passage of a lubricating oil 67 is used for the input shaft 9 which makes up the input shaft portion 8. This shaft member is disposed in such a manner as to extend from the vicinity of an opening in the clutch case 15 to a deep portion in the interior of the transmission case 16, or, specifically speaking, to the vicinity of an end wall 16a which lie on an opposite side of the transmission case 16 to a side thereof which faces the clutches 12, 13. The remaining input shaft 10 is made up of a tubular shaft member and is fitted on an outer circumferential surface of the input shaft 9. In addition, needle bearings 11, which constitute bearing portions, are interposed between the outer circumferential surface of the input shaft 9 and an inner circumferential surface of the input shaft 10, whereby both the input shafts 9, 10 are made to freely rotate relative to each other. In addition, reference numeral 11a denotes a through hole which routes the lubricating oil 67 from the interior of the input shaft 10 to the needle bearing 11. The input shaft 10 covers the input shaft 9 from one end lying to face the clutches 12, 13 to substantially a half-way point to the other end which resides within the transmission case 16. Then, the resulting dual-shaft intermediate portion is supported by a bearing 17a which is attached to an end wall 16b which partitions between the clutch case 15 and the transmission case 16. The transmission case 16 side end portion of the input shaft 9 is supported by a bearing 17b which is attached to the end wall 16a. Thus, the input shaft 9 is supported rotatably by virtue of the support by the bearings 17a, 17b in the ways described above, and the input shaft 10 is supported in such a manner as to rotate about the axial center of the input shaft 9. The end portion of the input shaft 9 which projects into the clutch case 15 is connected to the clutch 13 or, specifically, a clutch plate 13a of the clutch 13, and similarly, an end portion of the input shaft 10 which projects into the clutch case 15 is connected to the clutch 12 or, specifically, a clutch plate 12a of the clutch 12, whereby when the clutch 13 is applied, rotational power outputted from the engine 70 is transmitted to the input shaft 9, whereas when the clutch 12 is applied, the rotational power outputted from the engine 70 is transmitted to the input shaft 10. Namely, the rotational power of the engine 70 is configured to be transmitted selectively to the input shaft 9 or the input shaft 10 when the clutches 12, 13 are operated accordingly.

Figure 4:
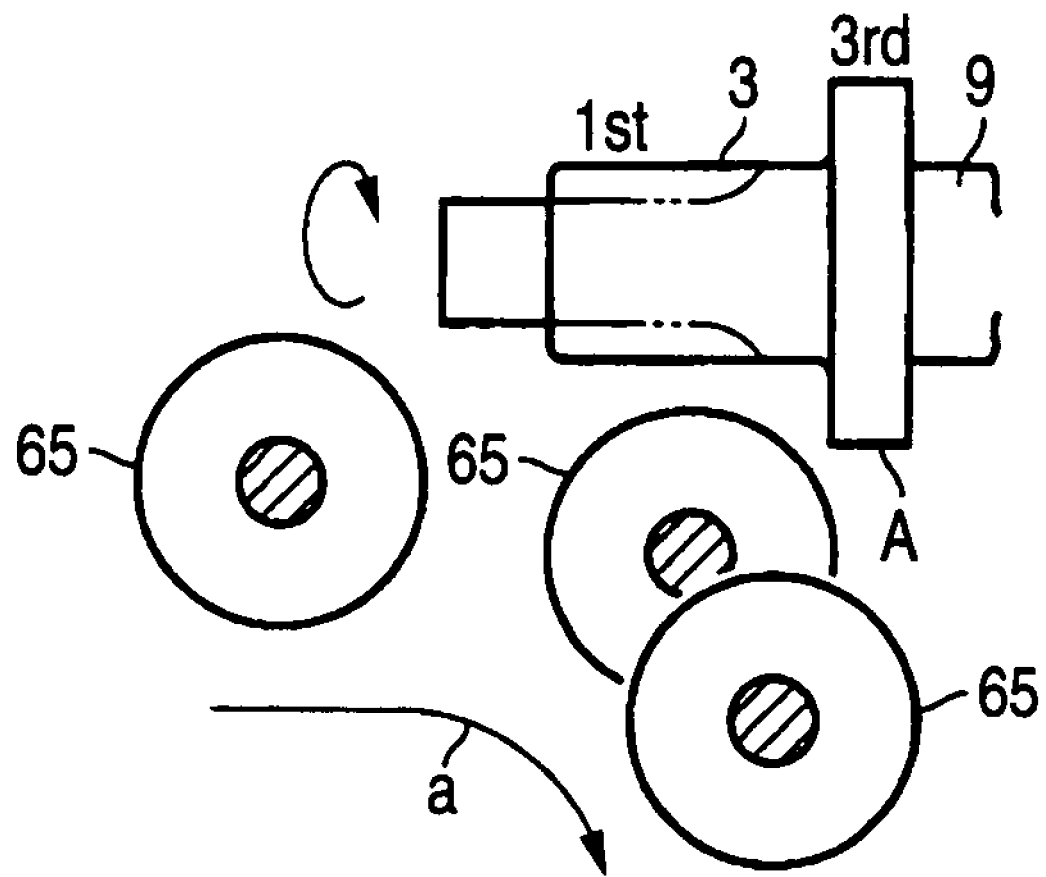
FIG. 4 is a drawing which illustrates how a meshing tooth is produced directly on an input shaft.

The drive gearwheels 3 to 7 are provided on the input shafts 9, 10 in such a manner as to be divided into two predetermined gear group. To be specific, forward gears (first to sixth gears) are divided into an even-numbered gear group and an odd-numbered gear group, and the drive gearwheels 3 to 5 which correspond to the odd-numbered gear group of the gear groups so divided are provided on the input shaft 9. Specifically, the drive gearwheels of the odd-numbered gear group are provided in such a manner that the drive gearwheel 3 for the first gear (low-speed gear), the drive gearwheel 4 for the third gear and the drive gearwheel 5 for the fifth gear are provided in that order from a point adjacent to the bearing 17b (a rear end side of the transmission) on a shaft portion 9a (of the input shaft 9) which projects from the input shaft 10. In particular, with a view to attaining an effective reduction ratio, a construction as is shown in FIG. 4 is used for the drive gearwheel 3 for the first gear in which a toothed portion 3b (meshing teeth) is formed directly on the outer circumferential surface of the input shaft by means of a tooth cutting tool 65, which construction is different from one applied to the drive gearwheels 4, 5 for the third and fifth gears in which a disc-like hub portion is provided on the shaft portion 9a, and meshing teeth are formed on the hub portion by means of a tool. In order to secure the strength of the input shaft, the outside diameter of the toothed portion 3b and the outside diameter of the input shaft 9 are equal to each other. A distance between the output shaft 41 and the input shaft portion 8 is suppressed by virtue of the formation of the drive gearwheel 3. In addition, as to the drive gearwheel which is adjacent to the drive gearwheel 3 for the first gear, here, the drive gearwheel 4 for the third gear is selected so that it takes a shorter distance for avoiding the interference with the tooth cutting tool 65 which is delivered as indicated by an arrow a when producing the drive gearwheel 3 for the first gear as shown in FIG. 4. Further, an increase in distance between the drive gearwheel 3 and the drive gearwheel for the lower gear (here, the drive gearwheel 4 for the third gear) is suppressed as well.

The drive gearwheels corresponding to the even-numbered gear group are provided on the input shaft 10. Specifically, the drive gearwheels of the even-numbered gear group are provided on the input shaft 10 in such a manner that the drive gearwheel 6 which functions as drive gearwheels for the fourth and sixth gears and the drive gearwheel 7 for the second gear are provided in that order from the rear end side end portion of the transmission on the input shaft 10. By this configuration, when the clutch 13 is applied, the rotational power of the engine 70 is transmitted to the drive gearwheels 3 to 5 for the odd-numbered gears, whereas when the clutch 12 is applied, the rotational power of the engine 70 is transmitted to the drive gearwheels 6, 7 for the even-numbered gears.

On the other hand, to describe the output system 30 by reference to FIGS. 2 and 3, both the output shafts 40, 41 are provided within the transmission case 16 in such a manner as to be in parallel with the input shafts 9, 10. In particular, as is shown in FIG. 3, the output shaft 40 is provided at a point above the dual shaft construction portion of the input shafts 9, 10 (the input shaft portion), which is held between the output shafts 40, 41, while the output shaft 41 is provided at a point below the input shafts 9, 10. These output shafts 40, 41 are disposed in parallel with the input shafts 9, 10 with end portions thereof which are situated to face the clutches 12, 13 aligned with each other at the end wall 16b. In addition, the aligned ends of the output shafts 40, 41 are rotatably supported by bearings 38a, 38b which are built into the end wall 16b. The remaining ends of the output shafts 40, 41 which are situated on the rear end side of the transmission are rotatably supported by bearings 39*a*, 39*b* which are built into the end wall 16*a*. In addition, output gearwheels 42, 43 are provided respectively at the end portions of the output shafts 40, 41 which are situated to face the clutches 12, 13. These output gearwheels 42, 43 are made to mesh with a differential mechanism 44 which is mounted on a side portion of the transmission case 16. Specifically, the differential mechanism 44 is accommodated within a differential case 45 which is formed on the side portion of the transmission case 16 and is configured to include, respective elements specifically such as a differential gear portion 45*e* which is made up of a combination of pinion gears 45*a* to 45*d*, a ring gear 46 (a reduction gear) which inputs rotation into the differential gear portion 45*e* and axles 47*a*, 47*b* which transmit the rotational power which is distributed at the differential gear portion 45*e* to left and right drive wheels (not shown). The output gearwheels 42, 43 are made to mesh with the ring gear 46 of the differential mechanism 44. Reduction ratios of the output gears 42, 43 are set such that a final reduction ratio of the output shaft 40 which is disposed upwards becomes larger than a final reduction ratio of the output shaft 41 which is disposed downwards.

The driven gearwheels 31 to 36 are allocated on the output shafts 40, 41 which are constructed in the way described above in such a manner that the number of gears on the output shaft 40 becomes less than the number of gears on the output shaft 41. Specifically, the three driving gearwheels such as the driven gearwheel 31 for the fifth gear which meshes with the drive gearwheel 5, the driven gearwheel 32 for the fourth gear which meshes with the drive gearwheel 6 and the driven gearwheel 33 for the reverse gear are disposed in that order from the bearing 39*a* side on the output shaft 40. The four driven gearwheels such as the driven gearwheel 34 for the first gear which meshes with the drive gearwheel 3, the driven gearwheel 36 for the sixth gear which meshes with the drive gear 6 and the drive gearwheel 37 for the second gear which meshes with the drive gearwheel 7 are disposed in that order from the bearing 39*b* side on the output shaft 41. Among these gearwheels, tooth width dimensions $\alpha 1$, $\alpha 2$ of the drive gearwheels 3, 7 (for the first gear which has a largest reduction gear ratio and the second gear which has the second largest reduction gear ratio) for the lower gears which are disposed adjacent to the bearings 17*a*, 17*b*, respectively, are both set larger than tooth width dimensions $\beta 1$, $\beta 2$ of the driven gearwheels 34, 37 with which the drive gear wheels 3, 7 mesh, respectively. Only these driven gearwheels 34, 37 which mesh with the wider drive gearwheels 3, 7, respectively, are made to so mesh in such a state that they are displaced to one of sides of the mating gearwheels in the width direction. In addition, these driven gearwheels 31 to 37 are made to be supported rotatably on outer circumferential surfaces of the output shafts 40, 41 by the use of needle bearings 48 which constitute bearing portions.

The synchromesh mechanisms 50 to 53 are also provided to be allocated on the output shafts 40, 41 in such a manner as to match the layout of the driven gearwheels 31 to 37 which is described above. Specifically, on the output shaft 40, the synchromesh mechanism 50 which is adapted to be shifted in two directions for selection of the fourth gear and the reverse gear is disposed between a shaft portion between the driven gearwheel 32 (for the fourth gear) and the driven gearwheel 33 (for the reverse gear), and the synchromesh mechanism 51 which is adapted to be shifted in one direction for selection of the fifth gear is disposed on a shaft portion which lies towards the bearing 39*a* across the driven gearwheel 31 (for the fifth gear). In addition, on the output shaft 41, the synchromesh mechanism 52 which is adapted to be shifted in two directions for selection of the first gear and the third gear is disposed between a shaft portion between the driven gearwheel 34 (for the first gear) and the driven gearwheel 35 (for the third gear), and the synchromesh mechanism 53 which is adapted to be shifted in two directions for selection of the sixth gear and the second gear is disposed between a shaft portion between the driven gearwheel 36 (for the sixth gear) and the driven gearwheel 37 (for the second gear). Due to the arrangement of these synchromesh mechanisms, an end portion of the upper output shaft 40 is retracted further towards the clutches 12, 13 than an end portion of the lower output shaft 41 by an extent equal to a difference in the number of gears provided between the output shafts 40, 41.

A construction is adopted for each of the synchromesh mechanisms 50, 52, 53 which are adapted to be shifted in two directions in which a synchronizer sleeve 56 is assembled axially slidably on an outer circumferential portion of a synchronizer hub 55 which is spline fitted on a shaft portion, a pair of synchronizer cones 57 are formed on each of the gearwheels which are disposed on both sides of the synchronizer hub 55, and a pair of synchronizer rings 58 are fittingly passed on an outer coned circumferential surface of the pair of synchronizer cones 57, respectively (the reference numerals being imparted to the synchromesh mechanisms 50, 52). By this construction, when the synchronizer sleeve 56 is caused to slide in either of axial directions, the output shaft 40 and the output shaft 41 are brought into engagement (synchronous mesh) with the driven gearwheels of the respective gears by virtue of friction between the synchronizer ring 58 and the synchronizer cone 57 while a difference in rotational speed being reduced, whereby transmission of rotational power is performed therebetween.

Here, the synchromesh mechanism 52 which is assembled to the lower gear driven gearwheel 34 (for the first gear) whose gearwheel diameter is larger than the outside diameter of the synchronizer sleeve 56 is disposed as close to the drive gearwheel 34 as possible. For this construction in which the synchromesh mechanism 52 is disposed in this way, a construction is adopted in which an annular recess 55*a* is formed about the axial center on the whole of a side surface of the driven gearwheel 34 which lies to face the synchromesh mechanism 52, and the synchronizer ring 58 and the synchronizer cone 57 are provided within the recess 55*a* so that part of the synchronizer sleeve 56 which slides enters the interior of the recess. Namely, the synchronizer sleeve 56 at this gear goes from the side surface of the driven gearwheel 34 (for the first gear) into a deeper position than at the other gears so as to complete synchronized meshing, whereby only a shorter distance is made to be necessary from the driven gearwheel 34 to the synchronizer hub 55 by such an extent that the synchronized meshing can be completed at the deeper position.

A construction is adopted for the one-way synchromesh mechanism 51 in which the synchronizer cone 57 and the synchronizer ring 58 which are situated on one side of the two-way synchromesh mechanisms 50, 52 are omitted and the synchromesh mechanism 51 is made to be shifted only in a direction in which it moves away from the bearing 39*a*. Namely, it is configured such that when the synchronizer sleeve 56 is caused to slide towards the driven gearwheel 31, the output shaft 40 is brought into engagement with the driven gearwheel 31 for the fifth gear by virtue of friction while reducing the difference in rotational speed.

A reverse idler gearwheel 60 is mounted concentrically on a side portion of the driven gearwheel 37 (for the second gear) which is opposite to a side thereof which faces the synchromesh mechanism 53. A gearwheel whose gearwheel diameter is smaller than that of the driven gearwheel 37 is used for the idler gearwheel 60. This idler gearwheel 60 meshes with the driven gearwheel 33 for the reverse gear on the output shaft 40, whereby when the reverse driven gearwheel 33 is brought into engagement with the output shaft 40 by the synchromesh mechanism, a reverse rotational output which is reduced in speed by a reduction ratio of the second gear, a reduction ratio of the reverse gear and a final reduction ratio of the output shaft 40 is made to be outputted from the output shaft 40.

On the other hand, a parking gearwheel 61 is provided at the transmission rear end side end portion (the retracted end portion) of the output shaft 40 whose overall length is shorter. This park gearwheel 61 is provided adjacent to a change-speed component on the output shaft 40 which is disposed closest to the transmission rear end side end portion thereof among the components thereon, that is, an outside (an axial end side) of the synchromesh mechanism 51 which is adapted to be shifted only in one direction. Specifically, the parking gearwheel 61 is interposed between the bearing 39a and the synchronizer hub 55 (the synchromesh mechanism 51) by sharing a splined portion on an outer circumference of the output shaft 40 where the synchromesh mechanism 50 is mounted. Needless to say, the parking gearwheel 61 is made to be brought into engagement with and disengagement from a gear locking pawl member 62 which is assembled to the transmission case 16 as is shown in FIG. 3, whereby when parking the vehicle, the output shaft 40 is made to be locked through engagement with the pawl member 62 (locking of the axles 47a, 47b).

As is shown in FIG. 3, an oil reservoir 66 is formed within the transmission case 16 and a lower portion (a bottom portion) within the differential case 45 which is continued from the transmission case 16. Lubricating oil 67 is reserved within the oil reservoir 66 in such an amount that portions of the driven gearwheels 34, 37 for the lower gears (the first and second gears) which lie below axial centers thereof are submerged in the lubricating oil 67 so reserved, whereby the lubricating oil 67 within the oil reservoir 66 is splashed by the driven gearwheels 34, 37 and the drive gearwheels 3, 7 when they rotate, and the splashed oil is then received at exposed, non-occupied tooth width portions 3a, 7a (non-meshing portions) at the side portions of the drive gearwheels 3, 7 so as to splash the received oil on to the adjacent bearings 17a, 17b, respectively. Thus, the lubricating oil 67 can be supplied to the respective components which need lubrication.

On the other hand, engagement and disengagement operations of the clutches 12, 13 (the pusher plates 12a, 13a) and shift selecting operations of the synchromesh mechanisms 50 to 53 are implemented by actuators (not shown) which are controlled through instructions issued from, for example, an ECU. Thus, the double clutch transmission is configured such that the loss of engine power in transmission resulting from the disruption of power transmission is suppressed to a minimum level according to gear ratio change information set in the ECU.

Namely, to describe the function of the double clutch transmission, when shifted into the first gear, firstly, the synchronizer sleeve 56 of the synchromesh mechanism 52 of the odd-numbered gear group is caused to slide to the first gear side by an actuator which is activated by a change-speed instruction outputted from the ECU, so that the driven gearwheel 34 for the first gear is brought into engagement with the output shaft 41, whereby the first gear is selected. Thereafter, the clutch 13 is operated to be engaged by an actuator which is activated by a similar change-speed instruction from the ECU. When the clutch 13 is so operated, the gear shift to the first gear is completed, whereby the output of the engine 70 is changed in speed along the transmission line of the odd-numbered system in which the output is transmitted from the input shaft 9 to the output shaft 41 via the drive gearwheel 3 for the first gear and the driven gearwheel 34 for the first gear. Then, the rotation whose speed has been so changed is outputted from the output gearwheel 43 to the differential mechanism 44, so as to be transmitted to the left and right axles 47a, 47b, whereby the vehicle is driven in the first gear. Note that the clutch 12 is operated to be disengaged.

While the vehicle is running in the first gear, when a change-speed instruction to the second gear is outputted, by making use of the state in which the clutch 13 is engaged while the clutch 12 is disengaged, the synchronizer sleeve 56 of the synchromesh mechanism 53 of the even-numbered gear group is caused to slide to the second gear side, so as to bring the driven gearwheel 37 for the second gear into engagement with the output shaft 41 which is rotating at the current vehicle speed, whereby the drive gearwheel 7 of the second gear which is the next higher gear to be engaged is synchronized with the vehicle speed for selection of the second gear. Namely, the preparation for a gear ratio change for the next higher gear is completed. Thereafter, the clutch 12 is engaged while the clutch 13 is disengaged, whereby the power transmission from the engine 70 is switched from the input shaft 9 to the input shaft 10. Then, the output of the engine 70 is changed in speed along the transmission line of the even-numbered system in which the output of the engine 70 is transmitted from the input shaft 10 to the output shaft 40 via the drive gearwheel 7 for the second gear and the driven gearwheel 37 for the second gear, whereby the rotation whose speed is so changed is outputted from the output gearwheel 43 to the differential mechanism 44 (the gear shift to the second gear is completed). Then, the vehicle is shifted into the second gear on the spot to thereby be run in the second gear.

While the vehicle is running in the second gear, when a change-speed instruction to the third gear is outputted, by making use of the state in which the clutch 12 is engaged while the clutch 13 is disengaged, the synchronizer sleeve 56 of the synchromesh mechanism 52 of the odd-numbered gear group is caused to slide to the third gear side, so as to bring the driven gearwheel 35 for the third gear into engagement with the output shaft 40 which is rotating at the current vehicle speed, whereby the drive gearwheel 4 of the third gear which is the next higher gear to be engaged is synchronized with the vehicle speed for selection of the third gear. Namely, the preparation for a gear ratio change for the next higher gear is completed. Thereafter, the clutch 12 is disengaged while the clutch 13 is engaged, whereby the power transmission from the engine 70 is switched again from the input shaft 10 to the input shaft 9. Then, the output of the engine 70 is changed in speed along the transmission line of the odd-numbered system in which the output of the engine 70 is transmitted from the input shaft 9 to the output shaft 41 via the drive gearwheel 4 for the third gear and the driven gearwheel 35 for the third gear, whereby the rotation whose speed is so changed is outputted from the output gearwheel 43 to the differential mechanism 44 (the gear shift to the third gear is completed). Then, the vehicle is shifted into the third gear on the spot to thereby be run in the third gear.

Then, the gears are selected alternately between the odd-numbered gear group and the even-numbered gear group by the synchromesh mechanisms 50, 51, 53 and the clutches 12, 13 in similar ways to those described above, and by switching the clutches 12, 13 alternately, gear shifts to the remaining fourth, fifth and sixth gears will be implemented continuously in similar ways to those in which the gear shifts to the first to third gears are implemented while suppressing the power transmission loss to the minimum level.

In addition, for a gear shift to the reverse gear, the synchronizing sleeve 56 of the synchromesh mechanism 50 is caused to slide to the reverse gear side from a state where the clutches 12, 13 are both disengaged, so as to bring the reverse gearwheel 33 into engagement with the output shaft 40, whereby the gear for the reverse gear is selected. Thereafter, the clutch 12 is operated to be engaged, whereby the output from the engine 70 is transmitted from the input shaft 10 to the differential mechanism 44 via the drive gearwheel 37 for the second gear, the driven gearwheel 37 for the second gear, the idler gearwheel 60 which is mounted on the gearwheel 37, the reverse driven gearwheel 33, the output shaft 40, and the output gearwheel 42. Namely, the rotation of the output shaft 40 is converted into a reverse rotational output whose speed is reduced by the reduction ratio of the second gear, the reduction ratio of the reverse gear, and furthermore, the final reduction ratio of the output shaft 41, whereby the vehicle is reversed with the large reduction ratio.

On the other hand, during these gearshift operations, the drive gearwheel 3 for the first gear (the lowest gear) of the odd-numbered gear group and the drive gearwheel 7 for the second gear (the second lowest gear) of the even-numbered gear group, which are disposed adjacent to the bearings 17*a*, 17*b*, respectively, and the driven gearwheels 34, 37 which mesh with the drive gearwheels 3, 7, respectively, are caused to continue to rotate by the rotational power of the engine 70 which is transmitted from the input shafts 9, 10.

Figure 5A:
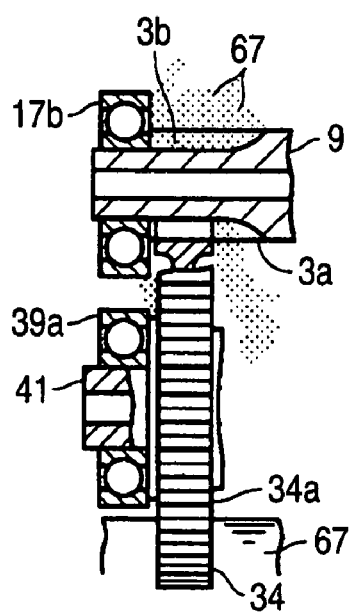
FIGS. 5A and 5B are drawings which illustrate how lubricating oil is supplied to bearings.
Figure 5B:
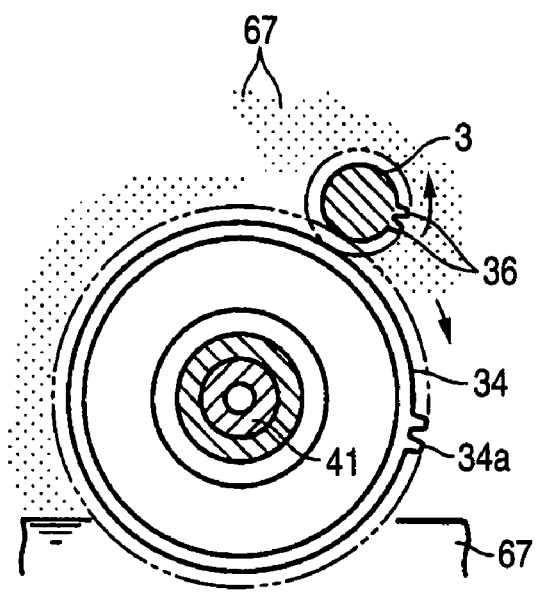

As this occurs, since the driven gearwheels 34, 37 (for the first and second gears) continue to rotate while being submerged in the lubricating oil 67 as is shown in FIGS. 5A, 5B, the lubricating oil 67 is stirred by toothed portions 34*a*, 37*a* (only one of them being shown in the figures) of the driven gearwheels 34, 37 as is shown in the same figures so as to be splashed within the transmission case 16. In addition, the lubricating oil 67 is so splashed, while part of the lubricating oil so splashed is being received at the non-meshing portion of the drive gearwheel 3, that is, the exposed tooth width portion 3*a* of the side portion of the drive gearwheel 3 and the non-meshing portion of the drive gearwheel 7, that is, the exposed tooth width portion 7*a* of the side portion of the drive gearwheel 7 (only the first gear side being illustrated).

Here, the drive gearwheels 3, 7 of the low gears (the first gear, the second gear) are disposed adjacent to the bearings 17*a*, 17*b* (the bearings on both the sides of the input shaft portion), respectively.

Because of this construction, the lubricating oil 67 is directly supplied to the portions which bear large load such as the bearing 17*b* for the input shaft 9 and the bearing 17*a* for the input shaft 10 by not only the lubricating oil atmosphere produced by the splash of lubricating oil 67 which results from the rotating driven gearwheels 34, 37 but also the behavior of the exposed, non-meshing portions 3*a*, 7*a* of the driven gearwheels 3, 7 receiving part of the splash of lubricating oil 67 and then splashing the lubricating oil 67 so received directly on to those bearings.

Consequently, the bearings 17*a*, 17*b* which support the input shaft portion 8 can be lubricated sufficiently by making use of the existing drive gearwheels 3, 7 (the components). In particular, where the drive gearwheels 3, 7 for the first and second gears whose tooth widths are widened are disposed adjacent to the bearings 17*a*, 17*b* which are disposed on both the end sides of the input shaft portion 8, respectively, both of the bearings 17*a*, 17*b* which are so disposed relative to the input shaft portion 8 can be lubricated sufficiently by making use of those existing components. Moreover, where the construction is adopted in which the meshing teeth 3*b* having the large tooth width dimension are formed directly on the drive gearwheel 3 (the low gear having the largest reduction ratio) which has the exposed, non-meshing portion 3*a* which receives the splash of lubricating oil 67, the distance between the input shaft portion 8 and the output shaft 41 is decreased, thereby making it possible to realize the compact main body portion 1. As this occurs, where the drive gearwheel 4 for the low gear is used as the drive gearwheel which is disposed adjacent to the drive gearwheel 3, the distance between the gearwheels 3, 4 can be decreased, and the main body portion 1 can be made more compact.

According to an aspect of the invention, since the lubricating oil is supplied to the bearings of the input shaft portion by not only the lubricating oil atmosphere produced by the lubricating oil splashed by the rotating driven gearwheels but also the action of the exposed tooth width portions of the drive gearwheels which are disposed adjacent to the bearings, respectively, receiving the splashed lubricating oil and then splashing the lubricating oil so received directly to the bearings disposed adjacent thereto, the sufficient lubrication can be implemented.

Consequently, the bearings which support the input shaft portion can be lubricated sufficiently by making use of the existing drive gearwheels (components).

According to an aspect of the invention, all the bearings which support the input shaft portion can be lubricated only by making use of the drive gearwheel which has the largest reduction ratio and the drive gearwheels which has the second largest reduction ratio.

According to an aspect of the invention, in addition to the advantages given as described above, the distance between the input shaft portion and the second output shaft can be decreased by such an extent that the meshing teeth are formed directly on the input shaft, and this provides another advantage that the double clutch transmission can be made compact by such an extent that the relevant distance can be decreased.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A double clutch transmission, comprising:
an input system, comprising:
an input shaft portion, comprising:
a first input shaft, in which drive gearwheels of one gear group of two predetermined gear groups into which a plurality of gears are divided are arranged on an outer circumferential surface thereof; and
a second input shaft, which is rotatably fitted on the outer circumferential surface of the first input shaft, and in which drive gearwheels of the other gear group are arranged on an outer circumferential surface thereof;
bearings, rotatably supporting the input shaft portion; and
clutches, provided at end portions of the first and second input shafts, respectively, for transmitting rotational power of an engine to the first or second input shafts;
an output system, comprising:
a first output shaft, which is parallel to the input shaft portion;
a second output shaft, which is parallel to the input shaft portion;
a plurality of driven gearwheels, which are operable to mesh with the drive gearwheels of the first and second input shafts; and synchromesh mechanisms, operable to transmit rotational power to the driven gearwheels; and an oil reservoir, provided below the second output shaft for reserving lubricating oil in such an amount that driven gearwheels for low gears which are disposed on the second output shaft are submerged therein; wherein drive gearwheels for low gears are disposed adjacent to the bearings, respectively, on the input shaft portion, the driven gearwheels for the low gears which mesh with the drive gearwheels for the low gears are disposed on the second output shaft, tooth width dimensions of the drive gearwheels for the low gears are larger than tooth width dimensions of the driven gearwheels for the low gears, and exposed tooth width portions of the drive gearwheels for the low gears constitute oil splashing portions which splash lubricating oil which is splashed by the driven gearwheels for the low gears on to the bearings which are disposed adjacent to the drive gearwheels for the low gears, respectively, wherein the bearings are a pair of bearings which are disposed on an end portion of the first input shaft and on the second input shaft, respectively, in the input shaft portion, a first drive gearwheel for a low gear having a largest reduction ratio is disposed on one of the first input shaft which is adjacent to one of the pair of bearings and the second input shaft which is adjacent to the other of the pair of bearings, and a second drive gearwheel for a low gear having a second largest reduction ratio is disposed on the other input shaft, and the second output shaft is provided with driven gearwheels which mesh with the first and second drive gearwheels, respectively.

2. The double clutch transmission according to claim 1, wherein the first drive gearwheel is disposed on the first input shaft which is adjacent to the one of the pair of bearings, and a meshing tooth is formed by tooth cutting the outer circumferential surface of the first input shaft directly.

3. The double clutch transmission according to claim 2, wherein the input shaft portion is provided with a third drive gearwheel having a reduction ratio which is smaller than that of the second drive gearwheel and a fourth drive gearwheel having a reduction ratio which is smaller than that of the third drive gearwheel, the first drive gearwheel is formed by tooth cutting the first input shaft in an axial direction of the first input shaft, the third drive gearwheel is disposed at a downstream side of the first drive gearwheel in a tooth cutting direction, and the third drive gearwheel is disposed between the first drive gearwheel and the fourth drive gearwheel.

4. The double clutch transmission according to claim 1, wherein the one of the pair of bearings which is adjacent to the first drive gearwheel supports the first input shaft, and an outside diameter of the first drive gearwheel is equal to an outside diameter of the first input shaft.

* * * * *